(12) United States Patent
Tippins (10) Patent No.: US 8,147,644 B2
(45) Date of Patent: Apr. 3, 2012

(54) METHOD OF MANUFACTURING THERMOPLASTIC MEMBRANE ARTICLES AND METHODS OF USE

(75) Inventor: William D. Tippins, Westfield, IN (US)

(73) Assignee: Firestone Building Products Company, LLC, Indianapolis, IN (US)

( * ) Notice: Subject to any disclaimer, the term of this patent is extended or adjusted under 35 U.S.C. 154(b) by 585 days.

(21) Appl. No.: 11/922,545

(22) PCT Filed: Jun. 19, 2006

(86) PCT No.: PCT/US2006/023771
§ 371 (c)(1),
(2), (4) Date: Feb. 5, 2009

(87) PCT Pub. No.: WO2007/001967
PCT Pub. Date: Jan. 4, 2007

(65) Prior Publication Data
US 2009/0214841 A1    Aug. 27, 2009

Related U.S. Application Data

(60) Provisional application No. 60/692,298, filed on Jun. 20, 2005, provisional application No. 60/723,528, filed on Oct. 3, 2005.

(51) Int. Cl.
*B32B 37/26*    (2006.01)
*B32B 38/04*    (2006.01)
*B32B 25/16*    (2006.01)
*B29C 65/00*    (2006.01)

(52) U.S. Cl. ... 156/271; 156/289; 156/192; 156/244.12; 156/244.18; 156/244.19; 156/246; 264/171.13; 264/171.17; 264/177.17; 264/146; 264/148

(58) Field of Classification Search ............... 428/101, 428/121; 264/171.13, 171.17, 177.17, 146, 264/148; 405/129.75, 129.95; 156/192, 156/244.12, 244.18, 244.19, 247, 270, 271, 156/289; 493/197, 202, 208
See application file for complete search history.

(56) References Cited

U.S. PATENT DOCUMENTS

| | | | |
|---|---|---|---|
| 3,321,804 | A | 5/1967 | Breidt et al. |
| 3,415,920 | A | 12/1968 | Lee et al. |
| 3,957,724 | A | 5/1976 | Schurb et al. |
| 3,997,702 | A | 12/1976 | Schurb et al. |
| 4,313,988 | A | 2/1982 | Koshar et al. |
| 4,567,073 | A | 1/1986 | Larson et al. |
| 4,614,667 | A | 9/1986 | Larson et al. |
| 4,678,375 | A | 7/1987 | Gagle et al. |
| 5,139,853 | A | 8/1992 | Mathieson et al. |
| 5,160,221 | A | 11/1992 | Rohe et al. |
| 5,190,711 | A | 3/1993 | Blemberg |

(Continued)

OTHER PUBLICATIONS

PCT International Search Report mailed Nov. 22, 2006 (3 pgs).
"Standard Test Method for Specular Gloss of Plastic Films and Solid Plastics," ASTM International, Designation: D2457-03, (2003), pp. 1-5.

(Continued)

*Primary Examiner* — Linda L Gray
(74) *Attorney, Agent, or Firm* — Jason A. Houser; Sarah M. Jabbari; Zollinger & Burleson Ltd.

(57) ABSTRACT

A release liner web has thermoplastic membranes coated on opposite sides of the release liner web that are thermoplastically fused proximally to an edge of the release liner web, nearly doubling the width of thermoplastic membranes that can be prepared using conventional equipment. Also described are geomembranes prepared from an amorphous or semi-crystalline thermoplastic sheet material and having a high gloss surface, and methods of manufacture and use of same.

27 Claims, 7 Drawing Sheets

U.S. PATENT DOCUMENTS

| | | |
|---|---|---|
| 5,202,190 A | 4/1993 | Kantner et al. |
| 5,290,615 A | 3/1994 | Tushaus et al. |
| 5,728,424 A | 3/1998 | Walling |
| 6,054,178 A | 4/2000 | Howells |
| 6,114,456 A | 9/2000 | Dewart et al. |
| 6,509,084 B2 | 1/2003 | Sturtevant et al. |
| 6,524,029 B2 | 2/2003 | Nobert et al. |

OTHER PUBLICATIONS

"Standard Test Method for Determining the Coefficient of Soil and Geosynthetic or Geosynthetic and Geosynthetic Friction by the Direct Shear Method," ASTM International, Designation: D5321-02, (2002), pp. 1-7.

"Flexible geomembrane interface strengths," PGI PVC Geomembrane Institute, found at website: http://pgi-tp.cee.uiuc.edu/forWeb/Technical_Files/list.asp?folder=Technical_Root/Interface%20Strength%20of%20PVC, (2005), 9 pgs.

METHOD OF MANUFACTURING THERMOPLASTIC MEMBRANE ARTICLES AND METHODS OF USE

CROSS-REFERENCE TO RELATED APPLICATIONS

This application claims the benefit of International Application No. PCT/US2006/023771 filed Jun. 19, 2006, entitled "METHOD OF MANUFACTURING THERMOPLASTIC MEMBRANE ARTICLES AND METHODS OF USE," which application is incorporated herein by reference in its entirety; claims the benefit of U.S. Provisional Application Ser. No. 60/692,298 filed on Jun. 20, 2005, entitled "METHOD OF MANUFACTURING ARTICLES USING A THERMOPLASTIC MEMBRANE," which application is incorporated herein by reference in its entirety; and claims the benefit of U.S. Provisional Application Ser. No. 60/723,528 filed Oct. 3, 2005, entitled "METHOD OF MANUFACTURING THERMOPLASTIC MEMBRANE ARTICLES AND METHODS OF USE," which application is incorporated herein by reference in its entirety.

FIELD OF INVENTION

The current invention relates to a method of manufacturing a partially fused thermoplastic membrane that is nearly twice as wide as compared to conventionally manufactured thermoplastic membranes. The current invention also relates to methods of manufacturing tubes and bladders using thermoplastic membranes. The invention also relates to method of use of glossy thermoplastic membranes for geomembrane applications.

BACKGROUND OF THE INVENTION

Thermoplastic webs have found application in many areas, for example as geomembranes to retain fluids such as water. Examples of typical uses of geomembranes are as liners in ponds, reservoirs, pits, canals and the like. Examples of such liner materials are described in U.S. Pat. No. 5,160,221 to Rohe, et. al. Additional uses for such membranes include protection from weather and the like, such as in roofing applications and other building applications. In many applications, very large sheets of thermoplastic webs are desired for use. However, the manufacturing size of the web is limited by the width of the available manufacturing equipment. For example, thermoplastic extruders are provided in widths up to 13 feet or so. As a general rule the wider the extruder, the more difficult it is provide a uniform thickness and desired quality of the web. When even larger webs than can be conveniently manufactured are needed for a particular application, separate web sections are often joined in a second step at a manufacturing facility or at the point of use in the field by adhering or welding separate sheets together. Field construction can be time consuming and challenging for many reasons, including the difficulty of handling large sections at the work site, the difficulty of keeping surfaces clean to provide good bonding, and the difficulty of providing a uniform and effective bond over long seams.

For several years, fabric mesh reinforced thermoplastic membranes have been available for use as a roofing membrane. The conventional way of making such membranes is to extrude molten thermoplastic onto one side of a fabric mesh to weld the fabric mesh to one side of the thermoplastic membrane. The resulting composite is then heated and a second layer of molten thermoplastic is extruded onto the other side of the fabric mesh to cover the fabric mesh and to weld the second thermoplastic to the first thermoplastic. U.S. Pat. No. 6,054,178 to Howells describes a method of manufacturing a fabric mesh reinforced monolithic thermoplastic membrane. The open mesh fabric is drawn into the gap between two calender rollers of a membrane extruder, a molten first thermoplastic material is extruded into the throat of the gap between the first roller and the first side of the fabric mesh, while a second molten thermoplastic material is simultaneously extruded into the throat of the gap between the second roller and the second side of the fabric mesh. The composite material is then drawn through the gap between the first and second rollers to force the molten first and second thermoplastic materials into and through the open mesh of the fabric to fuse and bond the molten first and second thermoplastic materials in and about the fabric mesh to form the fabric mesh reinforced monolithic thermoplastic membrane.

Configurations of roofing materials that are covering products comprising a membrane provided with and adhesive for adhering the covering product to a building structure are described in US Patent application Nos. 2004/0157074 and 2004/0191508 to Hubbard.

In the design of geomembranes for use in containment of fluids, such as liners for landfills, canals, ponds, and similar earthen constructions, a concern has been the tendency of material placed on top of the geomembrane to slide off of the membrane, particularly if the construction involves use of some angled berms or sidewalls as part of the containment structure. Another problem can be that the geomembrane itself slides off of the berm construction on which it is placed. Geomembranes have previously been prepared to purposefully provide one or both of the surfaces of the geomembrane with a large number of projections or recesses by embossing the geomembrane to improve the friction coefficient between the surface of the geomembrane and an adjoining surface. U.S. Pat. No. 5,728,424 describes systems and processes for providing the surface of a geomembrane with a textured surface. In this patent, systems and processes for applying particles or projections onto a surface of a geomembrane are described so as to improve the friction coefficient between the surface of the geomembrane and an adjoining surface. Similarly, methods for imparting antislip surfaces to various thermoplastic products, such as geomembrane sheets and liners, including landfill friction sheet and landscape reshaping restraints, are described in U.S. Pat. No. 6,509,084. Likewise, a geomembrane construction comprising a unitary structure fabricated by co-extrusion including a center core, a thermoplastic adhesive layer secured on one side of the center core, and a textured layer secured on the opposite side of the center core is described in U.S. Pat. No. 6,524,029.

It has also been noted in an article by the PVC Geomembrane Institute that

> Many PVC geomembranes are manufactured with a smooth side and an embossed side. The embossed side surface usually resembles a file and is called a "faille-finished" surface. Accordingly, a faille PVC geomembrane interface is one in which the faille-finished surface of a PVC geomembrane is sheared against another geosynthetic component. Test results indicate that the smooth side of the PVC geomembrane yields a larger interface shear resistance than the faille-finished side due to the higher flexibility and larger contact area of the smooth side. Since the faille side of a PVC geomembrane renders a lower interface shear resistance than the smooth side, it was deemed appropriate/conservative to compare the shear strength of the faille PVC geomembrane interfaces to the HDPE and VFPE geomembrane interfaces.

See internet site for pgi-tp.ce.uicu.edu Technical Files.

SUMMARY OF THE INVENTION

It has surprisingly been found that partially fused thermoplastic membranes can be made using conventional dual extrusion membrane extruders. The resulting partially fused membranes as produced in this process have an effective width that is nearly twice as wide as a conventional thermoplastic membrane previously delivered from factory manufacturing setting. The present method and product thus nearly doubles the effective width of thermoplastic membranes, providing unique membrane products in a highly cost effective manner.

In one aspect of the present invention, a method for manufacturing a wide, partially fused thermoplastic membrane is provided. In this method, a release liner web is drawn into a throat between parallel, spaced apart first and second nip rollers of a membrane extruder, the release liner web having first and second sides and first and second opposed edges. A molten first thermoplastic and a molten second thermoplastic that are compatible and fusible with each other are provided. The first thermoplastic is extruded between the first side of the release liner web and the first roller, and the molten second thermoplastic is extruded into the throat of the two rollers between the second side of the release liner web and the second roller, so that the resulting first and second thermoplastic membranes are wider than the release liner web and thereby fuse the first thermoplastic and the second thermoplastic proximally to the first and second edges of the release liner web to encapsulate the release liner web. One edge of the resulting thermoplastic/release liner web composite is slit to provide the first thermoplastic membrane coated on the first side of the release liner and the second thermoplastic membrane coated on the second side of the release liner, wherein the first thermoplastic membrane and the second thermoplastic membrane are fused proximally to the second edge of the release liner web. The aforementioned process can alternatively be performed using tandem calendaring systems.

A fused thermoplastic/release liner web composite is also provided, comprising a release liner web having first and second sides and first and second opposed edges, a first thermoplastic membrane coated on the first side of the release liner web, and a second thermoplastic membrane coated on the second side of the release liner web. The first thermoplastic membrane and the second thermoplastic membrane are thermoplastically fused proximally to the second edge of the release liner web.

In another aspect of the present invention, a method of simultaneously manufacturing a plurality of thermoplastic membranes is provided comprising drawing at least one release liner web into a throat between parallel, spaced apart first and second nip rollers of a membrane extruder, the release liner web having first and second sides and first and second opposed edges. Simultaneously a molten first thermoplastic and a molten second thermoplastic is extruded into the throat of the two rollers, wherein the first thermoplastic is extruded between the first side of the release liner web and the first roller, and wherein the molten second thermoplastic is extruded into the throat of the two rollers between the second side of the release liner web and the second roller, the resulting first and second thermoplastic membranes being wider than the release liner web, to form a thermoplastic/release liner web composite. Both edges of the resulting thermoplastic/release liner web composite are slit to provide the first thermoplastic membrane coated on the first side of the release liner and the second thermoplastic membrane coated on the second side of the release liner, and wherein the first thermoplastic membrane and the second thermoplastic membrane are not fused to each other. This method advantageously allows production of thermoplastic web material at twice the rate of manufacture using conventional extrusion techniques.

In another aspect of the present invention, a method of manufacturing a fused thermoplastic membrane tube is provided comprising drawing a release liner web into a throat between parallel, spaced apart first and second nip rollers of a membrane extruder, the release liner web having first and second sides and first and second opposed edges. A molten first thermoplastic and a molten second thermoplastic that are compatible and fusible with each other are simultaneously extruded into the throat of the two rollers, wherein the first thermoplastic is extruded between the first side of the release liner web and the first roller, and wherein the molten second thermoplastic is extruded into the throat of the two rollers between the second side of the release liner web and the second roller, the resulting first and second thermoplastic membranes being wider than the release liner web and thereby fusing the first thermoplastic and the second thermoplastic proximally to the first and second edges of the release liner web to encapsulate the release liner web and to form a thermoplastic/release liner web composite. The resulting thermoplastic/release liner web composite is cut in a cross machine direction to provide a thermoplastic/release liner tube.

In another aspect of the present invention, a method of manufacturing a fused thermoplastic membrane bladder is provided comprising drawing a release liner web having a predetermined length into a throat between parallel, spaced apart first and second nip rollers of a membrane extruder, the release liner web having first and second sides and first and second opposed side edges and front and back edges. A molten first thermoplastic and a molten second thermoplastic that are compatible and fusible with each other are simultaneously extruded into the throat of the two rollers, wherein the first thermoplastic is extruded between the first side of the release liner web and the first roller, and wherein the molten second thermoplastic is extruded into the throat of the two rollers between the second side of the release liner web and the second roller, the resulting first and second thermoplastic membranes being wider and longer than the release liner web. As a result, the first thermoplastic and the second thermoplastic are fused to each other proximally to the first and second side edges and the front and back edges of the release liner web to encapsulate the release liner web and to form a thermoplastic/release liner web composite. This composite is then cut in a cross machine direction at a location that does not correspond to the release liner to provide a thermoplastic/release liner bladder.

In another aspect of the present invention, it has surprisingly been found that an amorphous or semi-crystalline thermoplastic geomembrane will exhibit exceptional interface shear resistance if one or both major surfaces of the geomembrane is provided with a surface structure that has an average gloss value that is greater than about 10 in a 20° gloss angle measurement taken in accordance with ASTM 2457-03. In another embodiment, the amorphous or semi-crystalline thermoplastic geomembrane has one or both major surfaces of the geomembrane is provided with a surface structure that has an average gloss value that is greater than about 10 in a 20° gloss angle measurement, and an average gloss value of greater than about 30 in a 60° gloss angle measurement, both sets of measurements being taken in accordance with ASTM 2457-03.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION OF PRESENTLY PREFERRED EMBODIMENTS

Figure 1:
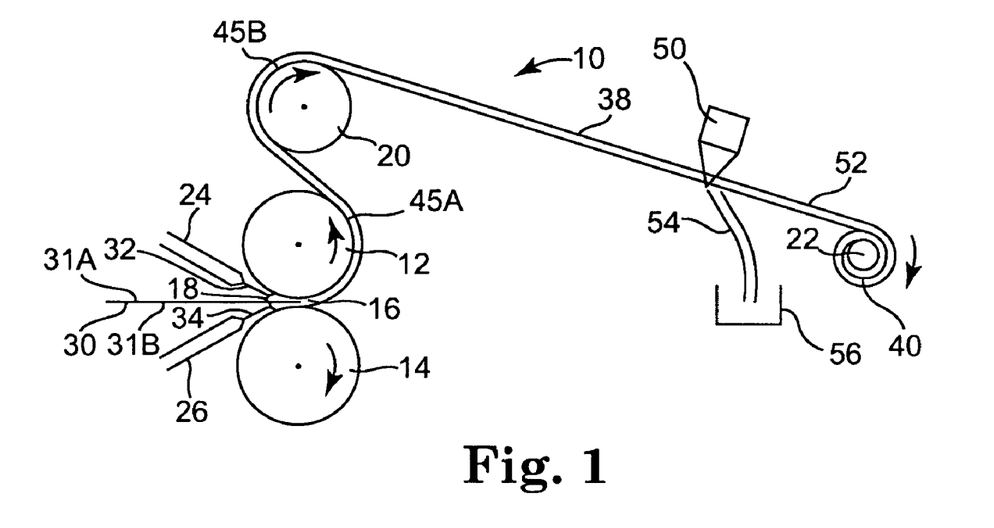
FIG. 1 is a schematic view of the membrane extrusion process of the present invention.

Turning now to the drawings, wherein like numbers represent like parts, FIG. 1 is a schematic view of the membrane extrusion process of the present invention. As shown, a membrane extruder 10 comprises a first nip roller 12, a second nip roller 14 and a cooling roller 20. A take up roller 22 is provided to reel up the thermoplastic/release liner web composite 52 as a roll 40. The space between the first and second roller is referred to as the roller gap 16 and the entrance into the gap is referred to as the throat 18. A first die or extruder nozzle 24 is located approximate the first roller in front of the throat and a second die or extruder nozzle 26 is located approximate the second roller in front of the throat.

Release liner 30 is drawn into the throat 18 under slight tension to maintain the release liner in a planar configuration. The first molten thermoplastic is extruded from the first nozzle 24 into the throat between the first side 31A of the release liner and the first roller 12. Simultaneously, the second molten thermoplastic 34 is extruded from the second nozzle 26 into the throat between the second side 31B and the second roller 14.

In one embodiment of the present invention, first roller 12 and second roller 14 are rotated at the same speed. Preferably, the rollers are maintained at the same speed that the release liner 30 is drawn into roller gap 16 between the first roller 12 and second roller 14. In an alternative embodiment of the present invention, first roller 12 and second roller 14 are rotated at different speeds with respect to each other. Preferably at least one roller is rotated at the same speed as the release liner 30 is drawn into roller gap 16 between first roller 12 and second roller 14.

In one embodiment of the present invention, release liner 30 is fed into the center of roller gap 16 with equal amounts of first and second thermoplastic being extruded into throat 18 of membrane extruder 10. In an alternative embodiment of the present invention, release liner 30 is fed into the center of roller gap 16 with a greater amount of the first thermoplastic being extruded into throat 18 than the amount of second thermoplastic being extruded into throat 18, or vice versa.

The thermoplastic/release liner web composite can optionally be prepared from two types of thermoplastic polymeric material, with one type of thermoplastic polymeric material being extruded from the first die or extruded nozzle 24 and the second thermoplastic polymeric material being extruded from the second die or extruder nozzle 26. The two thermoplastics must be compatible and must be able to fuse together to create the desired thermoplastic/release liner web composite. Preferably, the two thermoplastics will have similar thermal coefficients of expansion so that the resulting thermoplastic/release liner web composite will lie flat and not ripple.

Preferably, the first and second thermoplastics are made from materials that have similar melt indexes to facilitate fusing to each other and additionally for optional subsequent joining to additional sheets of material to form even larger continuous membranes. Preferably, the thermoplastics used in the present invention have melt indexes of 0.5 or higher, which are easier to join, e.g. by hot air welding, in the field.

The rollers are rotated as shown by the arrows to draw the release liner 30 and the extruded thermoplastic into the gap 16 between the rollers to fuse the first and second molten thermoplastic together and to encapsulate release liner 30 to form a thermoplastic/release liner web composite 38. The thermoplastic/release liner web composite 38 is preferably drawn from the gap at a speed of 4 to 8 feet per minute, although other speeds can be employed. As the thermoplastic/release liner web composite leaves the throat, the first side of the thermoplastic/release liner web composite 45A preferably is kept in contact with the surface of the first roller 12 to maintain the temperature of the thermoplastic/release liner web composite at an appropriate temperature to complete the fusing of the thermoplastic. The maintenance temperature varies for different thermoplastic melting points. The thermoplastic/release liner web composite 38 leaves the first roller and moves to the third roller 20 wherein the second side 45B of the thermoplastic/release liner web composite 38 contacts the surface of the roller 20 to additionally cool the second side and solidify it. The second and third rollers 14 and 20 are cooled with ambient temperature water. After leaving the gap and until the thermoplastic/release liner web composite leaves the nip roll set, the thermoplastic is still in a plastic or soft state, but has set, and can be imprinted with surface features if desired. More specifically, a particular finish can be applied to the thermoplastic/release liner web composite by imparting a particular finish to the surface of one or more rollers in the manufacturing process. The roller can be polished, smooth, roughened, or imprinted with a particular design, and the like, which is imparted into the side of the thermoplastic/release liner web composite when it is still in the relatively plastic state.

Between the third roller 20 and the take up reel 22, the thermoplastic/release liner web composite 38 is exposed to ambient air to cool the thermoplastic/release liner web composite down to ambient temperature.

Additionally, between the third roller 20 and the take up reel 22, the thermoplastic/release liner web composite 38 passes through a slitting assembly 50 where the web is slit into trim waste 54 and thermoplastic/release liner web composite 52 that is fused on only one edge. The slitting assembly can be provided by different types of slitting arrangements, but preferably is provided by a stationary blade. Trim waste 54 is preferably collected in hopper 56 for recycling. The cooled and slit thermoplastic/release liner web composite 52 is rolled into a roll 40 for transportation and storage.

Figure 2:
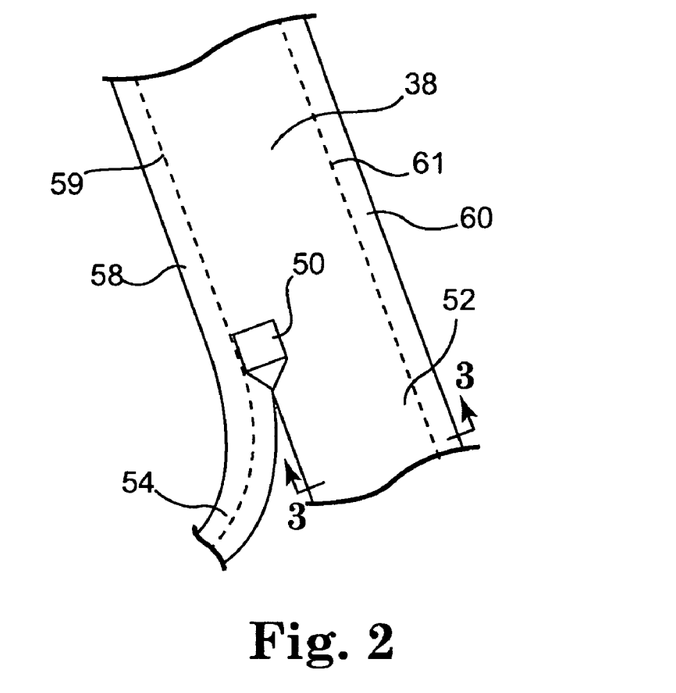
FIG. 2 is a top view of the thermoplastic/release liner web composite of the present invention.

FIG. 2 shows a top view of thermoplastic/release liner web composite 38 having first and second fused portions 58 and 60 proximal to first and second edges 59 and 61 (all shown in phantom) of release liner 30. Thermoplastic/release liner web composite 38 passes through a slitting assembly 50, where the web is slit into trim waste 54 and thermoplastic/release liner web composite 52 that is fused on only one edge. Slitting assembly 50 is positioned to slit thermoplastic/release liner web composite 38 on the inside of fused portion 58 (shown in phantom). Slitting assembly 50 thus cuts through the release liner web proximally to the edge 59 of release liner 30, thereby providing a thermoplastic/release liner web composite 52 that is fused on only one edge 60.

Figure 3:
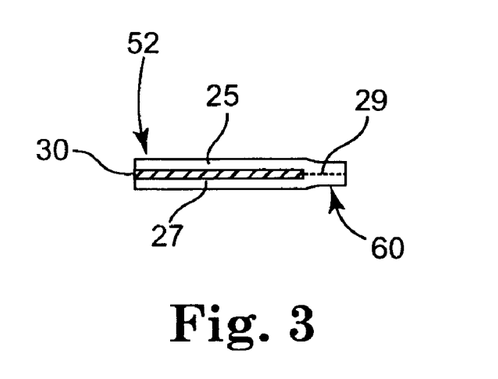
FIG. 3 is a cross sectional view of the thermoplastic/release liner web composite taken along lines 3-3 of FIG. 2.

FIG. 3 is a cross sectional view taken along lines 3-3 of FIG. 2 showing thermoplastic/release liner web composite 52 that is fused on only one edge 60. First thermoplastic membrane 25 that was formed by material that was extruded through first die or extruded nozzle 24 is fused to second thermoplastic membrane 27 that was formed by material that was extruded through second die or extruded nozzle 26 at fusion line 29. Because this fusion line 29 is formed by molten sheets of thermoplastic materials under factory conditions, the bond between first thermoplastic membrane 25 and second thermoplastic membrane 27 is exceptionally strong, uniform and reliable.

First thermoplastic membrane 25 and second thermoplastic membrane 27 are normally prepared in thicknesses of from 10 to 100 mils, although thicker membranes may be prepared and it may be possible to prepare membranes thinner than 10 mils. In preferred embodiments, the total width of the fused thermoplastic membrane (i.e. the bonded width of first thermoplastic membrane 25 in combination with second thermoplastic membrane 27 as fused) is greater than 10 feet, more preferably greater than 20 feet, and most preferably greater than 24 feet. Preferably the fused thermoplastic membrane is provided in roll form that is greater than 100 feet in length.

Figure 4:
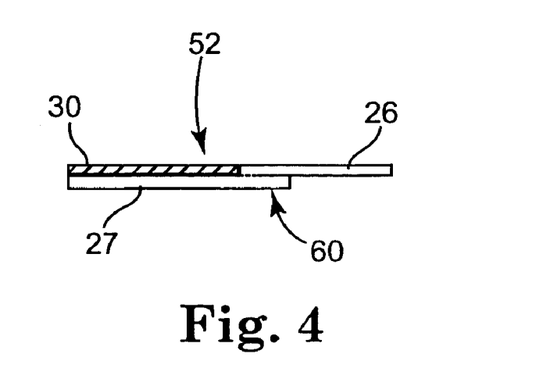
FIG. 4 is an edge view of the thermoplastic/release liner web composite of FIG. 3 in an open configuration.

FIG. 4 is an edge view of thermoplastic/release liner web composite 52 of FIG. 3 in an open configuration. In use, workers at the site of use will open the composite construction to provide use of the full combined width of membranes 25 and 27. Release liner 30 may stay in place in association with one or the other of membranes 25 or 27 to provide additional structural support or barrier functionality, or may optionally be removed. The fused membranes 25 and 27 when in the open portion comprise a unique fold-over tail at edge 60 as a result of the manufacturing process.

Figure 5:
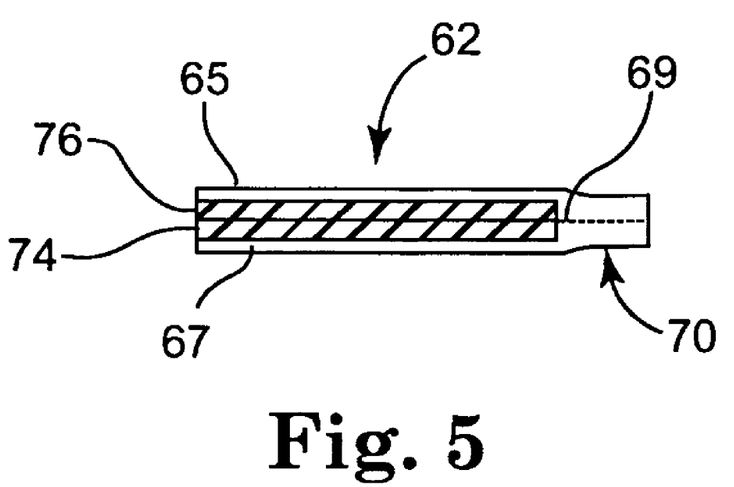
FIG. 5 is an edge view of a thermoplastic/release liner web composite of the present invention having two release liner webs.

FIG. 5 demonstrates an alternative embodiment of the present invention, wherein a thermoplastic/release liner web composite 62 that is fused on only one edge 70 and comprises two release liner webs 74 and 76. First thermoplastic membrane 65 that was formed by material that was extruded through first die or extruded nozzle 24 is fused to second thermoplastic membrane 67 that was formed by material that was extruded through second die or extruded nozzle 26 at fusion line 69. Because this fusion line 69 is formed by molten sheets of thermoplastic materials under factory conditions, the bond between first thermoplastic membrane 65 and second thermoplastic membrane 67 is exceptionally strong, uniform and reliable.

Figure 6:
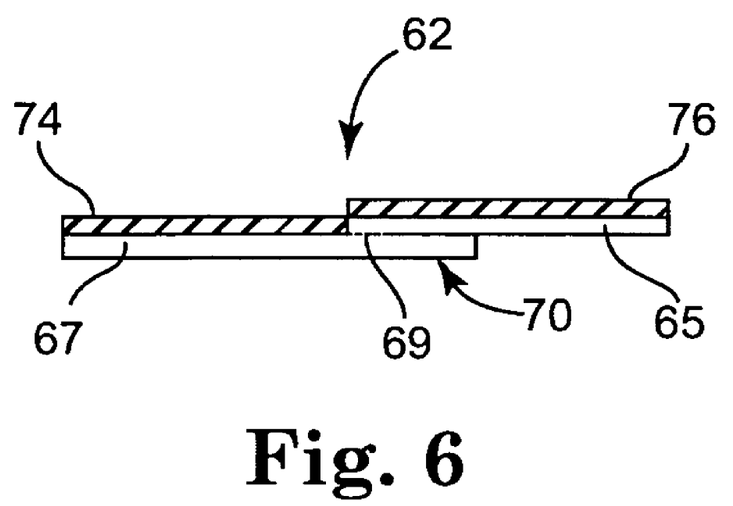
FIG. 6 is an edge view of the thermoplastic/release liner web composite of FIG. 5 in an open configuration.

FIG. 6 is an edge view of a thermoplastic/release liner web composite 62 of FIG. 5 in an open configuration. In use, workers at the site of use will open the composite construction to provide use of the full combined width of membranes 65 and 67. Release liner 74 may stay in place in association with membrane 67, and release liner 76 may stay in place in association with membrane 65 during the opening process. As above, release liner webs 74 and 76 may remain with membranes 56 and 67, to provide additional structural support or barrier functionality, or may optionally be removed. The fused membranes 65 and 67 when in the open portion comprise a unique fold-over tail at edge 70 as a result of the manufacturing process.

Figure 7:
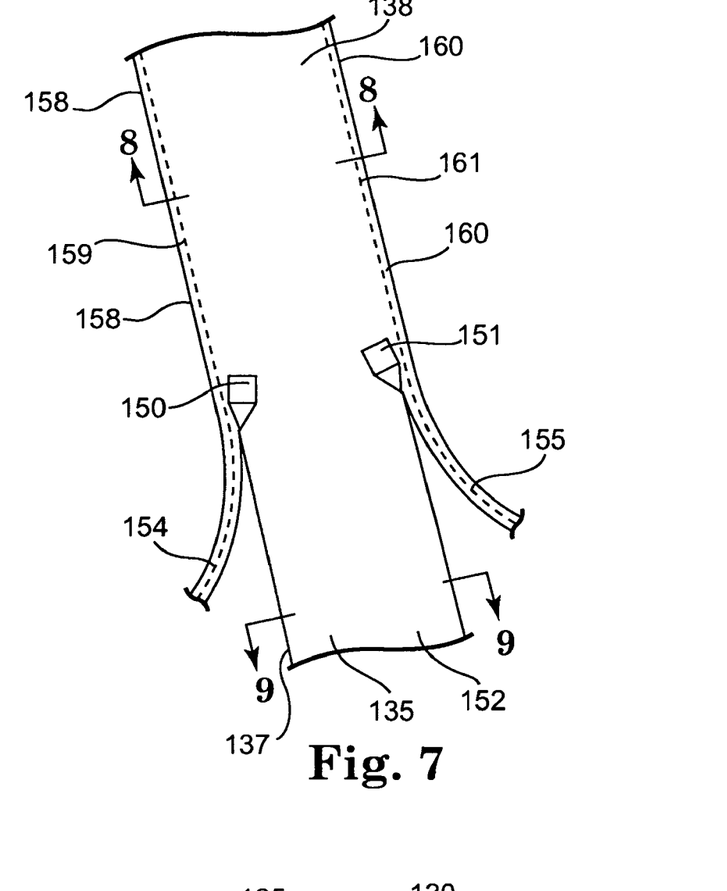
FIG. 7 is a top view of another embodiment of a thermoplastic/release liner web composite of the present invention.

FIG. 7 is a top view of another embodiment of a thermoplastic/release liner web composite 138 having first and second fused portions 158 and 160 proximal to first and second edges 159 and 161 (all shown in phantom) of release liner 130. Thermoplastic/release liner web composite 138 passes through two slitting assemblies 150 and 151, where the web is slit into trim waste 154 and 155. As a result, thermoplastic/release liner web composite 152 provides separate thermoplastic web sheets 135 and 137. Slitting assemblies 150 and 151 are positioned to slit thermoplastic/release liner web composite 138 on the inside of fused portions 158 and 160 (shown in phantom). Slitting assemblies 150 and 151 thus cut through the release liner web proximally to the edge 159 and 161 of release liner 130, thereby providing a thermoplastic/release liner web composite 52 having separate web sheets 135 and 137 that are not fused together. Thus, in a single pass on the web forming equipment, two thermoplastic webs are formed. This provides excellent efficiency in use of equipment, and also provides the manufacturing facility with the ability to quickly produce large amounts of thermoplastic web sheet material on order, thereby enabling the manufacturer to better serve customers in a "just-in-time" material production system and/or to provided larger quantities of material in a short amount of production time.

Figure 8:
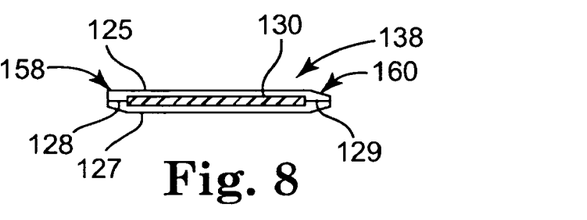
FIG. 8 is a cross sectional view of the thermoplastic/release liner web composite taken along lines 8-8 of FIG. 7.

FIG. 8 is a cross sectional view taken along lines 8-8 of FIG. 7 showing thermoplastic/release liner web composite 138. First thermoplastic membrane 125 that was formed by material that was extruded through first die or extruded nozzle 24 is fused to second thermoplastic membrane 127 that was formed by material that was extruded through second die or extruded nozzle 26 at fusion lines 128 and 129.

Figure 9:
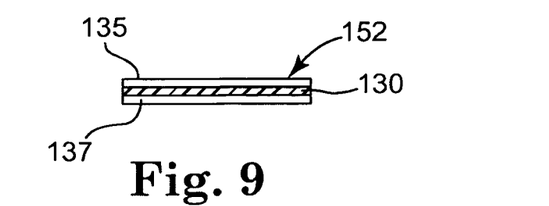
FIG. 9 is a cross sectional view of the thermoplastic/release liner web composite taken along lines 9-9 of FIG. 7.

FIG. 9 is a cross sectional view taken along lines 9-9 of FIG. 7 showing thermoplastic/release liner web composite 152 after trim waste 154 and 155 have been removed from composite 138. First thermoplastic web sheet 135 that was formed by material that was extruded through first die or extruded nozzle 24 is associated with one major surface of release liner 130, and second thermoplastic web sheet 137 that was formed by material that was extruded through second die or extruded nozzle 26 is associated with the other major surface of release liner 130. Because web sheets 135 and 137 are not fused together, each web sheet can be easily separated from release liner 130 to be provided as separately rolled products to the same or different customers. Alternatively, composite 152 can be provided to the customer as a single rolled product, for optional separation of web sheets 135 and 137 at the point of use.

Web sheets 135 and 137 are normally prepared in thicknesses of from 10 to 100 mils, although thicker web sheets may be prepared and it may be possible to prepare web sheets thinner than 10 mils. In preferred embodiments, the total width of each of the web sheets 135 and 137 is greater than 5 feet, more preferably greater than 10 feet, and most preferably greater than 12 feet. Preferably the web sheets 135 and 137 are provided, either separately or together in combination with the release liner, in roll form that is greater than 100 feet in length.

Figure 10:
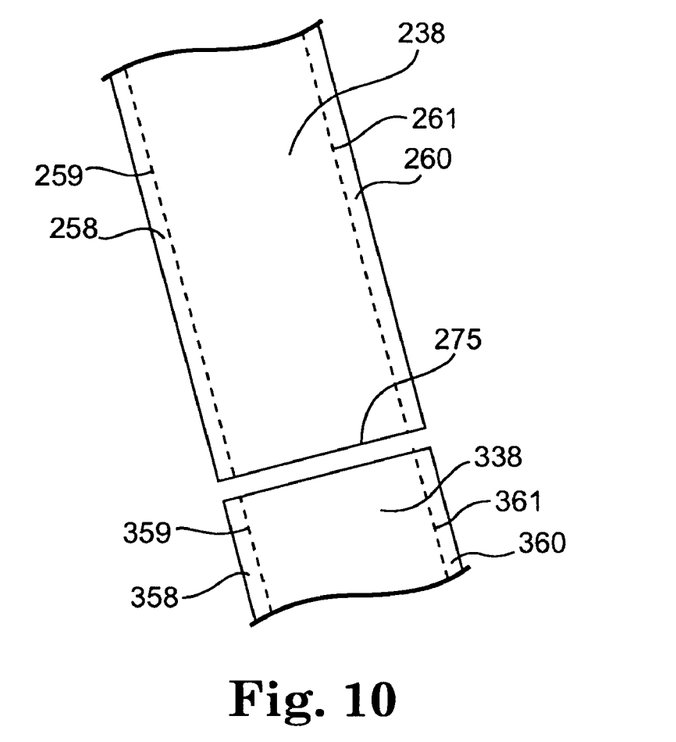
FIG. 10 is a top view of another embodiment of a thermoplastic/release liner web composite of the present invention.
Figure 11:
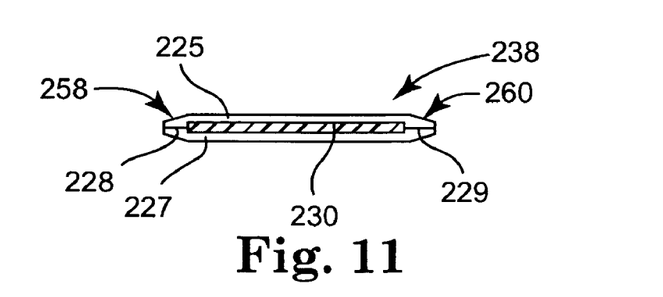
FIG. 11 is an edge view of the thermoplastic/release liner web composite of FIG. 10.
Figure 12:
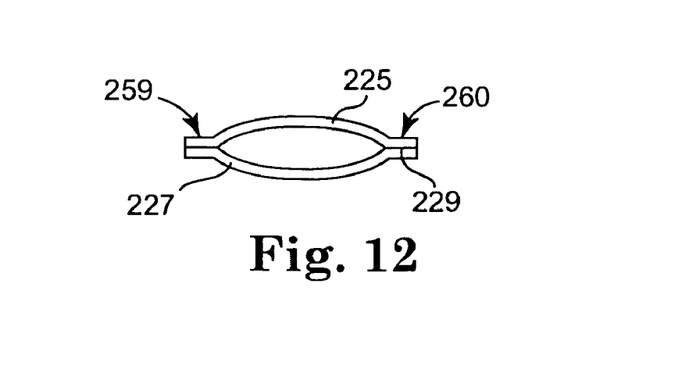
FIG. 12 is an edge view of the thermoplastic/release liner web composite of FIG. 10 with the release liner removed.

FIG. 10 is a top view of another embodiment of a thermoplastic/release liner web composite 238 having first and second fused portions 258 and 260 proximal to first and second edges 259 and 261 (all shown in phantom) of release liner 230. In this embodiment, rather than slitting in the machine direction, the web composite 238 is cut in the cross direction at cut line 275, thereby separating the web into separate portions 238 and 338, wherein thermoplastic/release liner web composite 338 similarly has first and second fused portions 358 and 360 proximal to first and second edges 359 and 361 (all shown in phantom) of release liner 330. FIG. 11 is an edge view of the thermoplastic/release liner web composite 238 of FIG. 10. First thermoplastic membrane 225 that was formed by material that was extruded through first die or extruded nozzle 24 is fused to second thermoplastic membrane 227 that was formed by material that was extruded through second die or extruded nozzle 26 at fusion lines 228 and 229. The thermoplastic membrane portions 225 and 227 thus provide a continuous membrane of thermoplastic material around release liner 230 to form a tube. Thermoplastic membrane portions 225 and 227 can be separated from release liner 230 by any appropriate technique (such as blowing a gas in the formed tube) and the release liner 230 can be optionally be removed from the thermoplastic/release liner web composite 338 as shown in FIG. 12 to provide a tube. It is specifically contemplated in an embodiment of the present invention that the tube can be provided with the release liner remaining in the tube. The web composite 238 can be cut in the cross direction at any desired interval to provide tubes of any desired length. In one aspect of this embodiment, the ends of the tube can optionally be sealed to form closed end tubes. Alternatively, both ends of the tube can be sealed to form a bladder or pillow construction. Optionally, the release liner can be pushed into the tube, removed or partially trimmed to facilitate sealing. In an alternative embodiment, a separate section of thermoplastic material is attached (e.g. by heat sealing) to the end of the tube to seal the tube. In one embodiment of the present invention, the tube is turned inside-out to present a hidden seam appearance to the tube.

Figure 13:
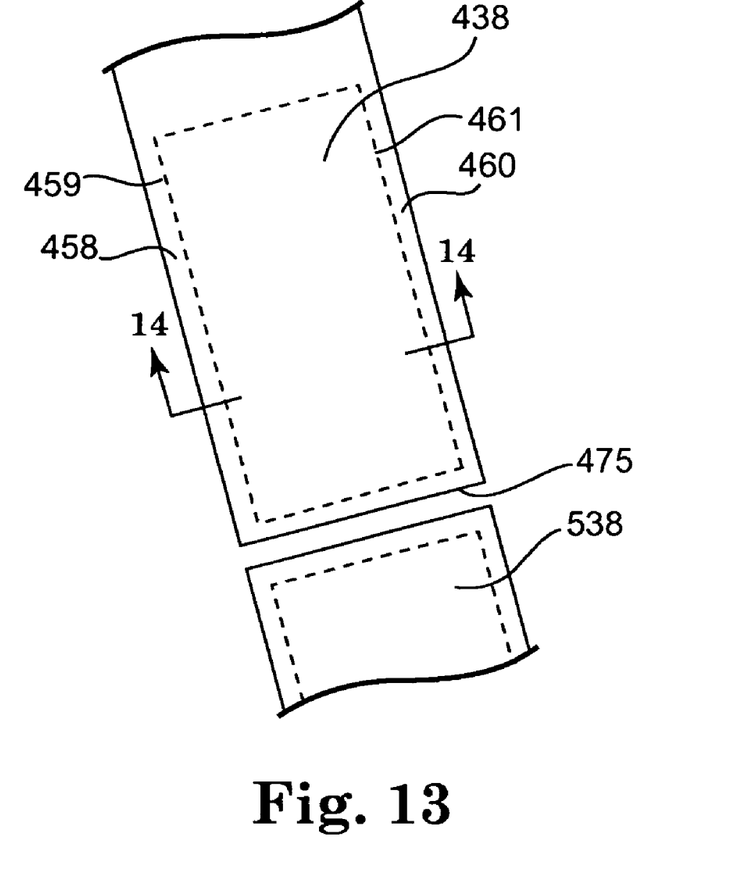
FIG. 13 is a top view of another embodiment of a thermoplastic/release liner web composite of the present invention.

FIG. 13 is a top view of another embodiment of a thermoplastic/release liner web composite 438 having first and second fused portions 458 and 460 proximal to first and second edges 459 and 461 (all shown in phantom) of release liner 430. In this embodiment, release liner 430 is provided in pieces having predetermined lengths, and rather than slitting in the machine direction, the web composite 438 is cut in the cross direction at cut line 475, thereby separating the web into separate portions 438 and 538.

Figure 14:
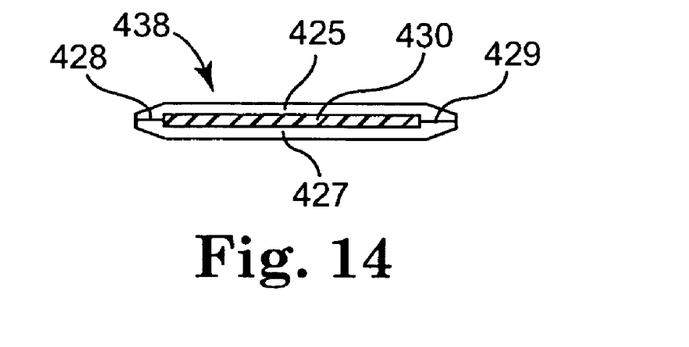
FIG. 14 is a cross sectional view of the thermoplastic/release liner web composite taken along lines 14-14 of FIG. 13.

FIG. 14 is a cross-sectional view of the thermoplastic/release liner web composite 438 of FIG. 13 taken along line 14-14. First thermoplastic membrane 425 that was formed by material that was extruded through first die or extruded nozzle 24 is fused to second thermoplastic membrane 427 that was formed by material that was extruded through second die or extruded nozzle 26 at fusion lines 428 and 429. The resulting thermoplastic/release liner web composite 438 encloses release liner 430. Optionally, air or liquid can be injected in thermoplastic/release liner web composite 438 to form a filled bladder or pillow, and the injection hole sealed closed to retain the air or liquid. Alternatively, a valve, port or the like can be mounted on the thermoplastic/release liner web composite 438 by techniques that will now be apparent to the skilled artisan for facilitating introduction of air or liquid into can be injected into the thermoplastic/release liner web composite 438 to form a filled bladder or pillow.

Figure 15:
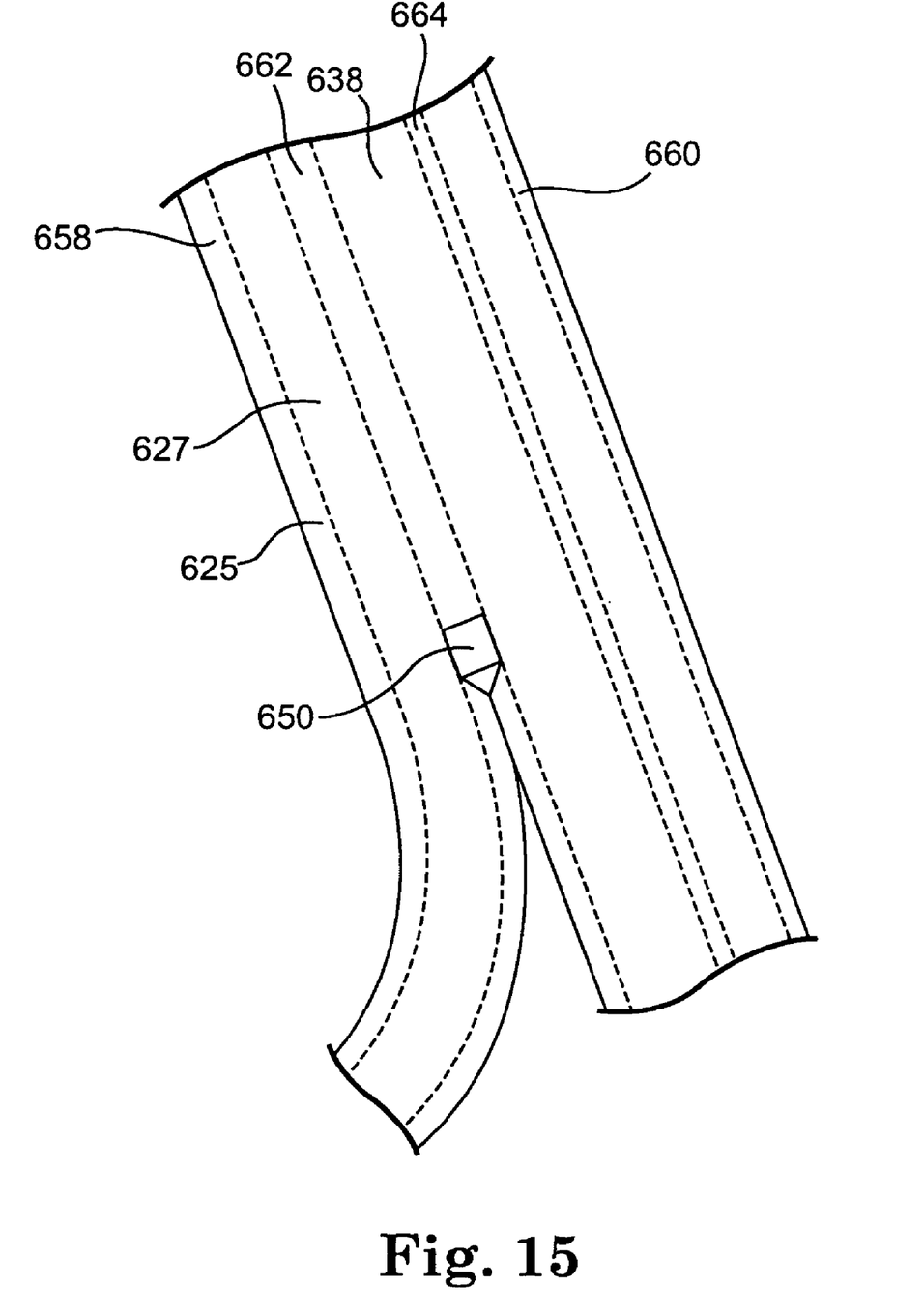
FIG. 15 is a top view of another embodiment of a thermoplastic/release liner web composite having release liners that are parallel in the machine direction.

FIG. 15 is a top view of another embodiment of a thermoplastic/release liner web composite 638 having parallel release liners 230, 232, and 234 (all shown in phantom) located between first and second thermoplastic membranes 625 and 627. First and second thermoplastic membranes 625 and 627 are fused together at fused portions 658, 660, 662 and 664. It will be apparent that two, three, four or more release liners can be provided between first and second thermoplastic membranes 625 and 627 as appropriate for the particular article to be prepared. As shown in FIG. 15, slitter 650 is positioned to slit thermoplastic/release liner web composite 638 at fused portion 662. Alternatively, slitter 650 can be positioned to cut through the release liner. It will now be appreciated that by incorporating a plurality of release liners, one can provide articles having multiple bladders or tubes (prepared in a manner as illustrated above) or combinations thereof, or can produce a plurality of individual bladders or tubes in one pass by selection of location of one or more slitters in the production line. The release liners may be selected from any material suitable for preventing adhesion of the first thermoplastics are well known and commercially available from a number of sources. Nonlimiting examples of release liners include release liners selected from polyethylene, polypropylene, or polyester release liners. Additional nonlimiting examples of release liners include release liners selected from Kraft paper, polyethylene coated paper or polymeric materials coated with polymeric release agents selected from silicone, silicone urea, urethanes, and long chain alkyl acrylate release agents.

Examples of polymeric release agent coatings are described in U.S. Pat. Nos. 3,957,724; 4,567,073; 4,313,988; 3,997,702; 4,614,667; 5,202,190; and 5,290,615; the disclosures of which are incorporated by reference herein. Examples of commercially available liners include Polyslik™ brand liners from Rexam Release of Oakbrook, Ill., USA and EXHERE™ brand liners from P.H. Glatfelter Company of Spring Grove, Pa., USA. Preferably the release liner is a polymer sheet having a melting point higher than the extrusion temperature of the thermoplastic membrane material.

Virtually any type of thermoplastic can be utilized in the present process. Preferably the thermoplastic has a melt index of at least 0.5 when tested at 2.14 Kg. at 190° C. Thermoplastics with higher melt indexes are less viscous when melted. Examples of thermoplastics suitable for use include thermoplastics such as: polyvinyl chloride (PVC) and thermoplastic polyolefins such as polyethylene (PE), linear polyethylene (LPE), polybutenes (PB), polypropylene (PP), co-polymers of polyolefins, ethylene-propylene rubber (EPR), ethylene-propylene copolymer (EPM), Ethylene Propylene Diene Monomer polymer (EPDM), EPDM blended with PP or PE or copolymer, acrylonitrile-butadiene-styrene (ABS) polymer, thermoplastic polyester, urethane and polyvinyl plastics and the like, or mixtures thereof. Polypropylene based thermoplastic olefin (a thermoplastic mixture of ethylene, propylene, polypropylene and EPR manufactured by Himont North America, Inc.) has been found to be very suitable because of its thermoplastic properties, its strength and its resistance to oxidation and UV.

Preferably the first and second thermoplastics are made from the same materials or substantially the same materials.

The first and second thermoplastics in one embodiment are blended composite polymers further comprising additives, such as UV screeners, UV absorbers, fire retardants, etc. to improve stability and/or weatherability. The term "UV absorber" refers to any conventional additive blended into a polymer to stabilize the adverse effects of light exposure, such as a loss of strength, degradation and decoloration. The use of a UV absorber may allow at least one layer of roofing membrane to exhibit good weathering characteristics. Examples of preferred UV absorbers additives include benzotriazole, benezophenones, hindered amine light stabilizers (HALS), non-interacting HALS (NOR-HALS), etc. The term "UV screener" refers to a conventional additive blended into a polymer to reflect ultraviolet rays. Examples of preferred UV screener additives include $TiO_2$, carbon black, zinc oxide, etc.

When the thermoplastic/release liner web composite is to be used as liners for canals, reservoirs, pits or the like, the thermoplastic is preferably pigmented with a black pigment such as carbon black. Carbon black is an excellent UV absorber and protects the thermoplastic from atmospheric oxidation. In one of the preferred embodiments of the present invention, the thermoplastic will be pigmented with a white pigment, such as titanium dioxide, to act as a light reflectant.

In one embodiment the large webs of the present invention can optionally be joined together in the field to make even larger webs when desired for certain applications. The webs can be joined together in any appropriate manner, such as by hot air welding an overlapping exposed section of one web to an overlapped section of another web. Alternatively, a hot melt adhesive may be applied to the underside of the overlapping section or the upper side of the overlapped section by spraying or knife coating methods. In other alternative embodiments, a transfer adhesives, an solvent based adhesive, or a water based adhesive may be applied to the underside of the overlapping section or the upper side of the overlapped section by traditional adhesive coating methods. In another alternative embodiment, an overlapping section of one web may be chemically welded to an overlapped section of a second web using known techniques.

In an embodiment of the present invention, an adhesive layer may be stripe coated on the outer surface of one of the thermoplastic membranes, preferably after slitting of the waste trim, at an edge of the membrane. The adhesive preferably is covered with a release liner to provide a ready-to-adhere joint for joining webs.

In another embodiment of the present invention, it has been found that a geomembrane can be prepared from an amorphous or semi-crystalline thermoplastic sheet material that will exhibit exceptional interface shear resistance if one or both major surfaces of the geomembrane is provided with a high gloss surface structure. Containment facilities, such as ponds, landfills and other fluid retention constructions, are typically formed by first constructing a containment basin having side walls constructed to contain fluids. The side walls of these basins advantageously have a relatively steep slope to provide more volume capacity with a smaller footprint. Preferably, at least one side wall of the containment basin will have a slope of at least about 3:1 (horizontal:vertical). In a preferred embodiment, the sidewall would have a slope of at least about 2:1. This containment basin is then lined with a geomembrane. In order to protect the geomembrane, a cover soil (which can be sand, clay or other such material) is often placed on the geomembrane. Because of the steep sidewalls discussed above, the cover soil will tend to slide off of the geomembrane at the aforementioned slopes. Therefore, a more complex construction has in the past been used to help keep the cover soil in place. Typically, a geotextile which is a fabric-type construction, has been put in direct contact with the geomembrane to provide a higher friction substrate. A geonet, which is a polymer net configured to help allow liquids to flow to the bottom of the containment facility, is then placed on top of the geotextile. Another geotextile is then placed on top of the geonet to prevent any soil from clogging the geonet. Finally, the soil is placed on top of the second geotextile.

Surprisingly, because of the surface characteristics of the present geomembrane, it is possible to provide a containment facility construction with steep sidewalls that have a comfortable factor of safety in expectation that the soil will not slide down the sidewalls of the containment facility when the soil is in direct contact with the geomembrane or when a geonet is in direct contact with the geomembrane.

The conventional wisdom regarding appropriate surface structure for a geomembrane suggests that one should provide projections or a rough surface to maximize friction of materials on a geomembrane. To the contrary, it has been found that a geomembrane with high gloss provides unexpected friction in the containment facility environment.

In a preferred embodiment, the geomembrane is prepared from an amorphous or semi-crystalline thermoplastic sheet material and has first and second major surfaces. At least the first major surface of the geomembrane is provided with a surface structure that has an average gloss value that is greater than about 10, more preferably greater than about 30, more preferably greater than about 50, and most preferably greater than about 70 in a 20° gloss angle measurement taken in accordance with ASTM 2457-03. In a preferred embodiment, both the first major surface and the second major surface of the geomembrane is provided with a surface structure that has an average gloss value that is greater than about 10, more preferably greater than about 30, more preferably greater than about 50, and most preferably greater than about 70 in a 20° gloss angle measurement taken in accordance with ASTM 2457-03 in order to prevent slippage of both the soil on top of the geomembrane, and also of the geomembrane itself.

In another embodiment of the present invention, the gloss value of one or both major surfaces of the geomembrane as discussed above is evaluated using two measurements, and at least the first major surface of the geomembrane is provided with a surface structure that has an average gloss value that is greater than about 10, more preferably greater than about 30, more preferably greater than about 50, and most preferably greater than about 70 in a 20° gloss angle and an average gloss value of greater than about 30, more preferably greater than about 50, and most preferably greater than about 70 in a 60° gloss angle measurement, both sets of measurements being taken in accordance with ASTM 2457-03. The gloss values of the inventive geomembranes are measured in the machine direction.

Preferably, the thermoplastic sheet material is either amorphous or semi-crystalline, and is selected from the group consisting of polyvinyl chloride, polyurethane, and thermoplastic polyolefin polymer materials. Preferably the thermoplastic sheet material has a Shore A hardness of less than about 100, and more preferably less than about 95. It has been found that thermoplastic sheet materials having this degree of hardness, when provided with a glossy surface structure as described herein, exhibit exceptional performance properties as a geomembrane.

In another embodiment of the present invention, a geomembrane is prepared from an amorphous or semi-crystalline thermoplastic sheet material, the geomembrane having first and second major surfaces. At least the first major surface of the geomembrane is provided with a surface structure having sufficient gloss value that the resulting geomembrane exhibits a secant angle that is greater than about 35 when measurement is using Type III sand at a normal force of 250 psf taken in accordance with ASTM D 5321-02.

In another embodiment of the present invention, a geomembrane prepared from an amorphous or semi-crystalline thermoplastic sheet material, the geomembrane having first and second major surfaces. At least the first major surface of the geomembrane is provided with a surface structure having sufficient gloss value that the resulting geomembrane exhibits a secant angle that is greater than about 25 at a normal force of 250 psf when measurement is made using a geonet taken in accordance with ASTM D 5321-02. The geonet to be used in this evaluation is a high density polyethylene net having a fabric weight of about 135 g/m².

The geomembrane of the present invention can be made by providing an ultrasmooth surface by formation of the geomembrane on a release liner web. More specifically, a geomembrane can be prepared by drawing a release liner web into a throat between parallel, spaced apart first and second nip rollers of a membrane extruder, the release liner web having first and second sides. A molten thermoplastic is simultaneously extruded into the throat of the two rollers, wherein the first thermoplastic is extruded between the first side of the release liner web and the first roller, thereby forming an amorphous or semi-crystalline thermoplastic sheet material having a first major surface in contact with the release liner web, wherein upon removal of the release liner web from the amorphous or semi-crystalline thermoplastic sheet material the first major surface of the thermoplastic sheet material exhibits high gloss.

In an alternative method, a geomembrane is prepared from an amorphous or semi-crystalline thermoplastic sheet material and provided with high gloss on at least one surface by extruding a molten thermoplastic into a throat between parallel, spaced apart first and second nip rollers of a membrane extruder, thereby forming an amorphous or semi-crystalline thermoplastic sheet material having a first and a second major surface and contacting at least the first major surface with a surface finishing roller under conditions to impart the first major surface of the thermoplastic sheet material with a high gloss surface. In a preferred embodiment, the surface finishing roller is a polished chrome roll.

Other methods of preparing a geomembrane from an amorphous or semi-crystalline thermoplastic sheet material and providing the sheet material with high gloss on at least one surface will now be apparent to the skilled artisan.

Because of the surprisingly high friction of the geomembrane, a method of forming a containment facility can be carried out wherein the geonet is applied directly to the geomembane. More specifically, a containment facility can be prepared by a) constructing a containment basin having at least one side wall having a slope of at least about 3:1 (horizontal:vertical)

b) lining the containment basin with the present geomembrane, wherein the second major surface is in contact with the containment basin construction;

c) positioning a geonet directly in contact with the first major surface of geomembrane;

d) positioning a geotextile directly in contact with the geonet; and e) applying a cover soil to the geonet.

This method provides substantial savings as compared to conventional techniques in the elimination of a layer of geotextile from the containment facility construction.

In another embodiment, the geonet and both layers of geotextile can be eliminated, with the cover soil being applied directly to the geomembrane. The resulting construction provides a surprisingly functional containment facility with savings by elimination of three layers that are conventionally required.

The geomembrane having the glossy surface provided by formation of the thermoplastic sheet material with a release liner as described herein can be provided in roll form in combination with the release liner. Upon delivery of the roll to the worksite, the release liner is removed, and the geomembrane is preferably positioned with glossy side up. Optionally, the release liner is removed at the manufacturing site, and the geomembrane is provided to the worksite without the release liner. This embodiment facilitates the recycling of the release liner, reduces the weight of material to be shipped to the worksite, and additionally adds convenience at the work site in reducing the amount of material that must be removed from the worksite.

In an alternative embodiment, the geomembrane is provided in the wide fused format as described herein, where the first thermoplastic membrane is peeled away from the first side of the release liner, and the release liner is then removed from the second thermoplastic membrane, wherein the first and second thermoplastic membranes have been fused together in the manufacturing process described above. This "double-wide" geomembrane is then positioned at the worksite, preferably with glossy side up.

In an alternative embodiment, the geomembrane is provided having release liners on both major surfaces of the thermoplastic sheet material. In one aspect of this embodiment, one of the release liners is removed from the thermoplastic sheet material to expose a glossy major surface, and the other release liner stays in place to provide a more durable geomembrane construction. In another aspect of this embodiment, both of the release liners are removed from the thermoplastic sheet material to provide a geomembrane having two glossy major surfaces. This aspect is particularly preferred where the geometry or materials of the containment facility suggest that the likelihood of sliding of the geomembrane itself warrants the provision of glossy surface on both sides of the geomembrane.

The specific orientation of the glossy side or sides of a geomembrane during construction of the containment facility of course applies likewise to geomembranes prepared by surface treating the thermoplastic sheet material to provide the desired glossy surface.

Gloss value measurements of a 30 mil PVC film geomembrane of the present invention after removal of the release liner were carried out in accordance with ASTM 2457-03. As a comparison, the gloss value measurements of a conventional embossed PVC geomembrane and of a polyester film (the same film as used as the release liner in the present construction) were also carried out. The results of this evaluation are reported in TABLE I below.

TABLE I

Gloss Readings -Monolta Multi-gloss 268 Instrument

|  | Glossy - MD | Glossy - CD | Embossed - MD | Embossed - CD | Coated - MD | Coated - CD | Smooth - MD | Smooth - CD |
|---|---|---|---|---|---|---|---|---|
| 20° - 1 | 84.5 | 84.6 | 0.5 | 0.6 | 133.0 | 131.0 | 1.7 | 1.1 |
| 20° - 2 | 83.9 | 84.6 | 0.6 | 0.7 | 132.9 | 130.3 | 1.2 | 1.2 |
| 20° - 3 | 84.6 | 84.7 | 0.8 | 0.8 | 132.1 | 131.3 | 1.1 | 1.3 |
| 20° - AVER | 84.3 | 84.6 | 0.6 | 0.7 | 132.7 | 130.9 | 1.3 | 1.2 |
| 60° - 1 | 92.5 | 91.4 | 5.9 | 6.6 | 120.1 | 116.2 | 19.9 | 8.7 |
| 60° - 2 | 91.8 | 91.6 | 6.5 | 6.4 | 119.7 | 115.6 | 13.6 | 8.9 |
| 60° - 3 | 91.6 | 91.5 | 7.1 | 7.7 | 119.5 | 116.0 | 11.9 | 9.2 |
| 60° - AVER | 92.0 | 91.5 | 6.5 | 6.9 | 119.8 | 115.9 | 15.1 | 8.9 |
| 85° - 1 | 100.7 | 94.5 | 8.0 | 8.7 | 100.9 | 107.4 | 59.4 | 16.3 |
| 85° - 2 | 99.7 | 100.1 | 8.9 | 8.8 | 107.6 | 104.0 | 42.4 | 16.8 |
| 85° - 3 | 104.1 | 93.9 | 8.6 | 9.4 | 102.8 | 108.9 | 46.4 | 19.8 |
| 85° - AVER | 101.5 | 96.2 | 8.5 | 9.0 | 103.8 | 106.8 | 49.4 | 17.6 |

Surface friction studies of a 30 mil PVC film geomembrane of the present invention with and without the removal of the release liner were carried out in accordance with ASTM D 5321-02. The results of this evaluation are reported in TABLE II below.

TABLE II

Interface Friction Testing at 250 psf

| Interface | Secant Angle | Slope | Slope Angle | Factor of Safety |
|---|---|---|---|---|
| Embossed PVC/Type III Sand | 28.7 | 3:1 | 18.4 | 1.65 |
| Embossed PVC/8 oz. N/W Geotextile | 25 | 3:1 | 18.4 | 1.40 |
| Smooth PVC/Type III Sand | 31.6 | 3:1 | 18.4 | 1.85 |
| Smooth PVC/8 oz. N/W Geotextile | 25.9 | 3:1 | 18.4 | 1.46 |
| Polyester Coated PVC/Type III Sand | 25.8 | 3:1 | 18.4 | 1.45 |
| Polyester Coated PVC/8 oz. N/W Geotextile | 13 | 3:1 | 18.4 | 0.69 |
| Glossy PVC/Type III Sand | 43.3 | 3:1 | 18.4 | 2.83 |
| Glossy PVC/Type III Sand | 43.3 | 2:1 | 26.6 | 1.88 |
| Glossy PVC/8 oz. N/W Geotextile | 38.9 | 3:1 | 18.4 | 2.43 |
| Glossy PVC/8 oz. N/W Geotextile | 38.9 | 2:1 | 26.6 | 1.61 |
| Glossy PVC/Geonet | 36.3 | 3:1 | 18.4 | 2.21 |
| Glossy PVC/Geonet | 36.3 | 2:1 | 26.6 | 1.47 |
| Typical PVC/Geonet | 17 | 3:1 | 18.4 | 0.92 |
| Typical PVC/Geonet | 17 | 4:1 | 14 | 1.23 |
| Typical PVC/Geonet | 17 | 5:1 | 11.3 | 1.53 |

Notes:
Typical pond/pit slopes are 3:1 (horizontal:vertical). Target factor of safety is 1.5.

All patents, patent documents, and publications cited herein are incorporated by reference as if individually incorporated. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

The invention claimed is:

1. A method of manufacturing a wide, fused thermoplastic membrane, comprising:
    drawing a release liner web into a throat between parallel, spaced apart first and second nip rollers of a membrane extruder, the release liner web having first and second sides and first and second opposed edges;
    simultaneously extruding a molten first thermoplastic and a molten second thermoplastic that are compatible and fusible with each other into the throat of the two rollers, wherein the first thermoplastic is extruded between the first side of the release liner web and the first roller, and wherein the-molten second thermoplastic is extruded into the throat of the two rollers between the second side of the release liner web and the second roller, the resulting first and second thermoplastic membranes being wider than the release liner web and thereby fusing the first thermoplastic and the second thermoplastic proximally to the first and second edges of the release liner web to encapsulate the release liner web and to form a thermoplastic/release liner web composite; and
    slitting an edge of the resulting thermoplastic/release liner web composite to provide the first thermoplastic membrane coated on the first side of the release liner and the second thermoplastic membrane coated on the second side of the release liner, wherein the first thermoplastic membrane and the second thermoplastic membrane are fused proximally to the second edge of the release liner web.

2. A method of simultaneously manufacturing a plurality of thermoplastic membranes, comprising:
    drawing a release liner web into a throat between parallel, spaced apart first and second nip rollers of a membrane extruder, the release liner web having first and second sides and first and second opposed edges;
    simultaneously extruding a molten first thermoplastic and a molten second thermoplastic into the throat of the two rollers, wherein the first thermoplastic is extruded between the first side of the release liner web and the first roller, and wherein the molten second thermoplastic is extruded into the throat of the two rollers between the second side of the release liner web and the second roller, the resulting first and second thermoplastic membranes being wider than the release liner web, to form a thermoplastic/release liner web composite; and
    slitting both edges of the resulting thermoplastic/release liner web composite to provide the first thermoplastic membrane coated on the first side of the release liner and the second thermoplastic membrane coated on the second side of the release liner, the first thermoplastic membrane not being fused to the second thermoplastic membrane.

3. The method of claim 2 further comprising winding the first thermoplastic membrane, the release liner and the second thermoplastic membrane together in a single roll.

4. The method of claim 2 further comprising removing the release liner from said first and second thermoplastic membranes and winding the first thermoplastic membrane and the second thermoplastic membrane in separate rolls.

5. A method of manufacturing a fused thermoplastic membrane tube, comprising:
  drawing a release liner web into a throat between parallel, spaced apart first and second nip rollers of a membrane extruder, the release liner web having first and second sides and first and second opposed edges;
  simultaneously extruding a molten first thermoplastic and a molten second thermoplastic that are compatible and fusible with each other into the throat of the two rollers, wherein the first thermoplastic is extruded between the first side of the release liner web and the first roller, and wherein the molten second thermoplastic is extruded into the throat of the two rollers between the second side of the release liner web and the second roller, the resulting first and second thermoplastic extrudates being wider than the release liner web and thereby fusing the first thermoplastic and the second thermoplastic extrudates proximally to the first and second edges of the release liner web to encapsulate the release liner web and to form a composite that comprises said extrudates and said release liner web; and
  cutting said composite in a cross machine direction to provide a thermoplastic/release liner tube.

6. The method of claim 5 further comprising removing the release liner.

7. A method of manufacturing a fused thermoplastic membrane bladder, comprising:
  drawing a release liner web having a predetermined length into a throat between parallel, spaced apart first and second nip rollers of a membrane extruder, the release liner web having first and second sides and first and second opposed side edges and front and back edges;
  simultaneously extruding a molten first thermoplastic and a molten second thermoplastic that are compatible and fusible with each other into the throat of the two rollers, wherein the first thermoplastic is extruded between the first side of the release liner web and the first roller, and wherein the molten second thermoplastic is extruded into the throat of the two rollers between the second side of the release liner web and the second roller, the resulting first and second thermoplastic membranes being wider and longer than the release liner web and thereby fusing the first thermoplastic and the second thermoplastic proximally to the first and second side edges and the front and back edges of the release liner web to encapsulate the release liner web and to form a thermoplastic/release liner web composite; and
  cutting the resulting thermoplastic/release liner web composite in a cross machine direction at a location that does not correspond to the release liner to provide a thermoplastic/release liner bladder.

8. The method of claim 7 further comprising introducing a gas or liquid in the thermoplastic/release liner bladder.

9. The method of claim 1, wherein the first thermoplastic and the second thermoplastic are substantially the same material.

10. The method of claim 1, wherein the first thermoplastic and the second thermoplastic comprise resins selected from polyvinyl chloride, polyethylene, linear polyethylene, polybutenes, polypropylene, co-polymers of polyolefins, ethylene-propylene rubber, ethylene-propylene copolymer, ethylene propylene diene monomer polymer, acrylonitrile-butadiene-styrene polymer, thermoplastic polyester, urethane and polyvinyl plastics, or mixtures thereof.

11. The method of claim 1, wherein the first thermoplastic and the second thermoplastic comprise polyvinyl chloride.

12. The method of claim 1, wherein the first thermoplastic membrane and the second thermoplastic membrane have thicknesses of from about 1 to about 100 mils.

13. The method of claim 1, wherein the total width of the fused thermoplastic membrane is greater than about 20 feet.

14. The method of claim 1, wherein the total width of the fused thermoplastic membrane is greater than about 24 feet.

15. The method of claim 1, wherein the thermoplastic/release liner web composite comprises two release liner webs.

16. The method of claim 2 wherein the first thermoplastic and the second thermoplastic are substantially the same material.

17. The method of claim 2 wherein each of the first thermoplastic and the second thermoplastic comprises resins selected from polyvinyl chloride, polyethylene, linear polyethylene, polybutenes, polypropylene, co-polymers of polyolefins, ethylene-propylene rubber, ethylene-propylene copolymer, ethylene propylene diene monomer polymer, acrylonitrile-butadiene-styrene polymer, thermoplastic polyester, urethane and polyvinyl plastics, or mixtures thereof.

18. The method of claim 2 wherein each of the first thermoplastic and the second thermoplastic comprises polyvinyl chloride.

19. The method of claim 2 wherein each of the first and second thermoplastic membranes has a thickness of from about 1 to about 100 mils.

20. The method of claim 7 wherein the first thermoplastic and the second thermoplastic are substantially the same material.

21. The method of claim 7 wherein each of the first thermoplastic and the second thermoplastic comprises resins selected from polyvinyl chloride, polyethylene, linear polyethylene, polybutenes, polypropylene, co-polymers of polyolefins, ethylene-propylene rubber, ethylene-propylene copolymer, ethylene propylene diene monomer polymer, acrylonitrile-butadiene-styrene polymer, thermoplastic polyester, urethane and polyvinyl plastics, or mixtures thereof.

22. The method of claim 7 wherein each of the first thermoplastic and the second thermoplastic comprises polyvinyl chloride.

23. The method of claim 7 wherein each of the first and second thermoplastic membranes has a thickness of from about 1 to about 100 mils.

24. The method of claim 5 wherein the first thermoplastic and the second thermoplastic are substantially the same material.

25. The method of claim 5 wherein each of the first thermoplastic and the second thermoplastic comprises resins selected from polyvinyl chloride, polyethylene, linear polyethylene, polybutenes, polypropylene, co-polymers of polyolefins, ethylene-propylene rubber, ethylene-propylene copolymer, ethylene propylene diene monomer polymer, acrylonitrile-butadiene-styrene polymer, thermoplastic polyester, urethane and polyvinyl plastics, or mixtures thereof.

26. The method of claim 5 wherein each of the first thermoplastic and the second thermoplastic comprises polyvinyl chloride.

27. The method of claim 5 wherein each of the first and second thermoplastic extrudates has a thickness of from about 1 to about 100 mils.

* * * * *